(12) United States Patent
Obata et al.

(10) Patent No.: US 6,272,478 B1
(45) Date of Patent: Aug. 7, 2001

(54) DATA MINING APPARATUS FOR DISCOVERING ASSOCIATION RULES EXISTING BETWEEN ATTRIBUTES OF DATA

(75) Inventors: Yasushi Obata; Satoshi Yasuda, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/001,942

(22) Filed: Dec. 31, 1997

(30) Foreign Application Priority Data

Jun. 24, 1997 (JP) .................................................. 9-167070

(51) Int. Cl.⁷ .................................................. G06F 15/18
(52) U.S. Cl. ...................................... 706/12; 707/3; 707/6
(58) Field of Search .................................. 395/701, 712; 706/45, 46, 12; 707/3, 7, 102, 1, 2, 6, 45

(56) References Cited

U.S. PATENT DOCUMENTS

| | | | |
|---|---|---|---|
| 5,615,341 | * 3/1997 | Agrawal et al. | 705/10 |
| 5,742,811 | * 4/1998 | Agrawal et al. | 707/6 |
| 5,819,266 | * 10/1998 | Agrawal et al. | 707/6 |
| 5,842,200 | * 11/1998 | Agrawal | 707/1 |
| 5,875,285 | * 2/1999 | Chang | 706/53 |
| 5,884,305 | * 3/1999 | Kleinberg et al. | 707/6 |
| 5,920,855 | * 7/1999 | Aggarwal et al. | 707/3 |
| 5,970,482 | * 10/1999 | Pham et al. | 706/16 |
| 5,983,222 | * 11/1999 | Morimoto et al. | 707/6 |
| 5,991,752 | * 10/1999 | Fukuda et al. | 707/1 |
| 6,061,682 | * 5/2000 | Agrawal et al. | 707/6 |
| 6,182,070 | * 1/2001 | Megiddo et al. | 707/6 |

FOREIGN PATENT DOCUMENTS 730 240 A2  9/1995 (EP) .
735 497 A2  10/1996 (EP) .
8-77010  3/1996 (JP) .

OTHER PUBLICATIONS

"A Visualization Method for Association Rules," by Takeshi Fukuda, Shinichi Morishita, Technical Report of The Institute of Electronics, Information and Communication Engineers, 1995–05, pp. 41–48.

Fortin et al., "An object oriented approach to multi level association rules mining", CIKM ACM pp. 65–72, 1996.*

Fukuda et al., "Mining optimized association rules for numeric attributes", PODS ACM, pp. 182–191, 1996.*

Agrawal et al., "Automatic subspace clustering of high dimensional data for data mining applications", SIGMOD ACM, pp. 94–105, 1998.*

(List continued on next page.)

*Primary Examiner*—Mark Powell
*Assistant Examiner*—Anil Khatri

(57) ABSTRACT

A data mining apparatus is disclosed for finding a useful association rule from among a large number of association rules discovered through data mining by setting evaluation criteria of the association rules which differ depending on the user's purpose. The data mining apparatus includes an association rule generator which forms and outputs an association rule file based on data items stored in a data base, an evaluation criterion assignor which outputs an evaluation criterion file based on the evaluation criterion assigned by the user, an association rule evaluator which calculates an evaluation value based on the evaluation criterion file and updates information about the association rules in the association rule file. The data mining apparatus further includes a performance result display which displays the re-evaluated value information of the association rules in the association rule file, re-arranges display order, limits the association rules to be displayed, and then displays the re-arranged and limited association rules.

18 Claims, 5 Drawing Sheets

OTHER PUBLICATIONS

Sarawagi et al., Integarting association rule mining with relational database system: alternatives and implications, SIGMOD ACM pp. 343–354, 1998.*

Park et al, "Efficient parallel data mining for association rules", ACM CIKM pp. 31–36, Jun. 1995.*

Han, "Mining knowledge at multiple concept level", ACM CIKM pp. 19–24, Jun. 1995.*

Park et al, "An effective hash based algorithm for mining association rules", ACM SIGMOD, pp. 175–186, Jun. 1995.*

Shintani et al, "Parallel mining algorithm for generalized association rules with classification hierarchy", ACM SIGMOD pp. 25–36, Jun. 1995.*

* cited by examiner

DATA DICTIONARY

| | PRICE | SELLING PRICE | PURCHASING PRICE | ... |
|---|---|---|---|---|
| BREAD | 120 | 120 | 75 | ... |
| BUTTER | 360 | 330 | 290 | ... |
| MILK | 130 | 120 | 80 | ... |
| JAM | 250 | 225 | 205 | ... |
| ... | ... | | | |

FIG. 4

DATA MINING APPARATUS FOR DISCOVERING ASSOCIATION RULES EXISTING BETWEEN ATTRIBUTES OF DATA

BACKGROUND OF THE INVENTION

1. Field of the Invention

The invention relates a data mining apparatus for analyzing a large body of data stored in a data base and discovering an association rule existing between attributes of the stored data.

2. Description of the Prior Art

A data mining apparatus discovers rules or causal relationships between data items from a large body of data stored in a data base. The typical example is the technology for mining association rules expressing relationships between the stored data items. As a specific example, the rule or association "when a data item A (subset) and a data item B (subset) exist in the same transaction, a data item C (subset) also commonly exists" is expressed as "A, B→C". A typical application of mining association rule is called basket analysis. Basket analysis determines an association of goods that customers put in their baskets (or shopping bags) during a trip to a retail shop. In the basket analysis, for example, the association rule "bread→milk" (the customer who buys the bread also buys the milk at a time) can be obtained by the association analysis using the accumulated sales receipt data.

The fundamental processing of the association analysis in the data mining system generates and verifies association rule candidates. In other words, the analysis generates association rule candidates from the combination of stored data items and verifies whether each candidate is interesting or not by counting the number of records satisfying the rule. Since it is not efficient to output every association rule, however, the conventional data mining system narrows the number of association rule candidates based on the criteria of support and confidence so that the useful association rules are found efficiently.

The support is a criterion signifying the generality of the association rule, and the confidence is a criterion signifying the accuracy of the association rule. The association rules are generally expressed by a logical formula of the form "A→B" accompanied with support and confidence values. Where it is assumed that A and B are non-empty, independent sets of data items, the support is expressed as the percentage of records including subset "A U B" which belong in both elements of subsets A and B out of the total number of records. The confidence is expressed as a ratio of records simultaneously including A and B to records including A. In the above-mentioned example of "bread→milk", if the percentage of customers who purchase bread is 20% and the percentage of customers who purchase both bread and milk is 12% out of all sales receipts (records number), the support of the association rule "bread→milk" is 12% and the confidence thereof is 60% (=12% /20%).

The conventional data mining apparatus sets lower threshold limits for support and confidence values when generating association rules, and discovers all association rules which exceed the lower threshold limits of both the support and confidence. A method for discovering the association rules is disclosed in detail, for example, in Laid-open Japanese patent publication No. 8-263346 or in Laid-open Japanese patent publication No. 8-287106. In the former patent publication, the apparatus initially generates association rule candidates which exceed the lower threshold limit of the support. This association rule generating step is disclosed in the latter patent publication No. 8-263346 in detail. Then, the apparatus examines the confidence of the association rule candidates, uses the candidates which exceed the lower threshold limit and outputs them as final association rules. In other words, the association rules obtained by this method are discovered based only on support and confidence. Therefore, other evaluation criteria, for example, contribution to sales or other user goals are not considered.

The number of association rules obtained as a result of such a data mining system is generally large. Further, most of the obtained association rules are not the rules which user wish to find or are meaningless. Therefore, the user has to discover useful rules which fit into his purpose from the large number of association rules.

In order to solve this problem and to discover only useful association rules for the user, it is necessary to use criteria for evaluating the usefulness of the association rules. For example, in the laid-open Japanese patent publication No. 8-77010, the evaluation criterion of an association rule is calculated by a cover ratio (corresponding to the above-mentioned support), expressed by the number of records in which the association rule holds and a hit ratio (corresponding to the above-mentioned confidence) expressed by the correct answer ratio of the association rule.

"A Visualization Method for Association Rules" by Takeshi Fukuda and Shinichi Morishita, technical report of The Institute of Electronics, Information and Communication Engineers, 1995–05, pp. 41–48, discloses a method to eliminate the "uninteresting association rules", namely, a method to narrow the unuseful association rules by statistically evaluating the support and the confidence.

The conventional data mining apparatus uses the support and the confidence as the evaluation criterion of the usefulness of the association rules. In other words, the association rules which have high generality (high support) and high accuracy (high confidence) are deemed useful association rules. Such evaluation criteria are effective for assessing the value of an association rule when the goal is simply to accurately express features of the stored data.

However, data mining is not only used for such a purpose, and usually is used for the purpose of decision-making and strategy and so on. If the association rules obtained by data mining are applied for certain purposes, for example, if the association rules obtained by the basket analysis stated above are applied to a sales promotion strategy, the association rules with high support and confidence are not always highly useful for the user's purpose (i.e., increasing sales). In this case, the association rule which is highly useful for the user's purpose is, for example, an association rule that can be relied upon to increase sales.

In this way, generally speaking, the value of association rules may vary depending on how the user intends to use the association rules. The uniform evaluation criteria of support and confidence used in the conventional data mining system do not always accurately evaluate the association rules relative to the user's purpose. Since the value of the association rule is evaluated based only on the support and the confidence in the conventional art, if the data mining is carried out to learn how much sales promotion can be achieved by using the association rule or to highlight the association rule which could be used to predict large profits, there occurs a problem that the association rule cannot be evaluated for such purposes since the support and the confidence have little to do with anticipating income.

SUMMARY OF THE INVENTION

It is an object of the present invention to provide a data mining apparatus in which user can use various evaluation criteria of association rules being different for every user's purpose. Thereby, the user can easily obtain association rules which serve the user's purpose from a large number of the association rules discovered by data mining.

According to one aspect of the invention, a data mining apparatus for discovering association rules includes an association rule generator which receives data from a data base and forms association rules between the data items, and an evaluation criterion assignor with which a user can assign an evaluation criterion for assessing the association rules which differs depending on the user's purpose. The data mining apparatus further includes an association rule evaluator which calculates each rule's value of the evaluation criterion assigned by the user by means of the evaluation criterion assignor, and a performance result display which displays the association rules generated by the association rule generator based on the values of the association rule calculated by the association rule evaluator.

Preferably, by the evaluation criterion assignor, user defines evaluation criterion based on a cost incurred upon applying the association rule and a profit gained when the association rule holds.

More preferably, the cost incurred upon applying the association rule and the profit gained when the association rule holds associated with an association rule are described using a fundamental arithmetic formula including terms for which the values of each item is defined in a data dictionary, and/or constant values.

Further preferably, the evaluation criterion assignor stores information relating to the cost incurred upon applying the association rule and the profit gained when the association rule holds in a storage apparatus and reads this information for subsequent reuse.

Still preferably, the association rule evaluator calculates an evaluation value of the association rule based on the cost incurred upon applying the association rule, the profit gained when the association rule holds which are assigned by the evaluation criterion assignor, a confidence showing accuracy (right answer factor) of the association rule in the data base, and the support showing a ratio of the number of records in which the association rule holds to the total number of records.

Further preferably, the association rule evaluator refers to an item value defined in the data dictionary when calculating an arithmetic formula in which the cost incurred upon applying the association rule and the profit gained when the association rule holds for an association rule are described.

Further preferably, the performance result display displays only the association rules having evaluation values exceeding a reference value assigned by the user.

Further preferably, the performance result display displays association rules arranged in ascending or descending order based on the evaluation values calculated by the association rule evaluator.

These and other objects of the present application will become more readily apparent from the detailed description given hereinafter. However, it should be understood that the detailed embodiments of the invention, are given by way of illustration scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 shows a data dictionary for explaining a specific example of the embodiment of the present invention.

DETAILED DESCRIPTION OF PREFERRED EMBODIMENTS

Embodiment 1

Figure 1:
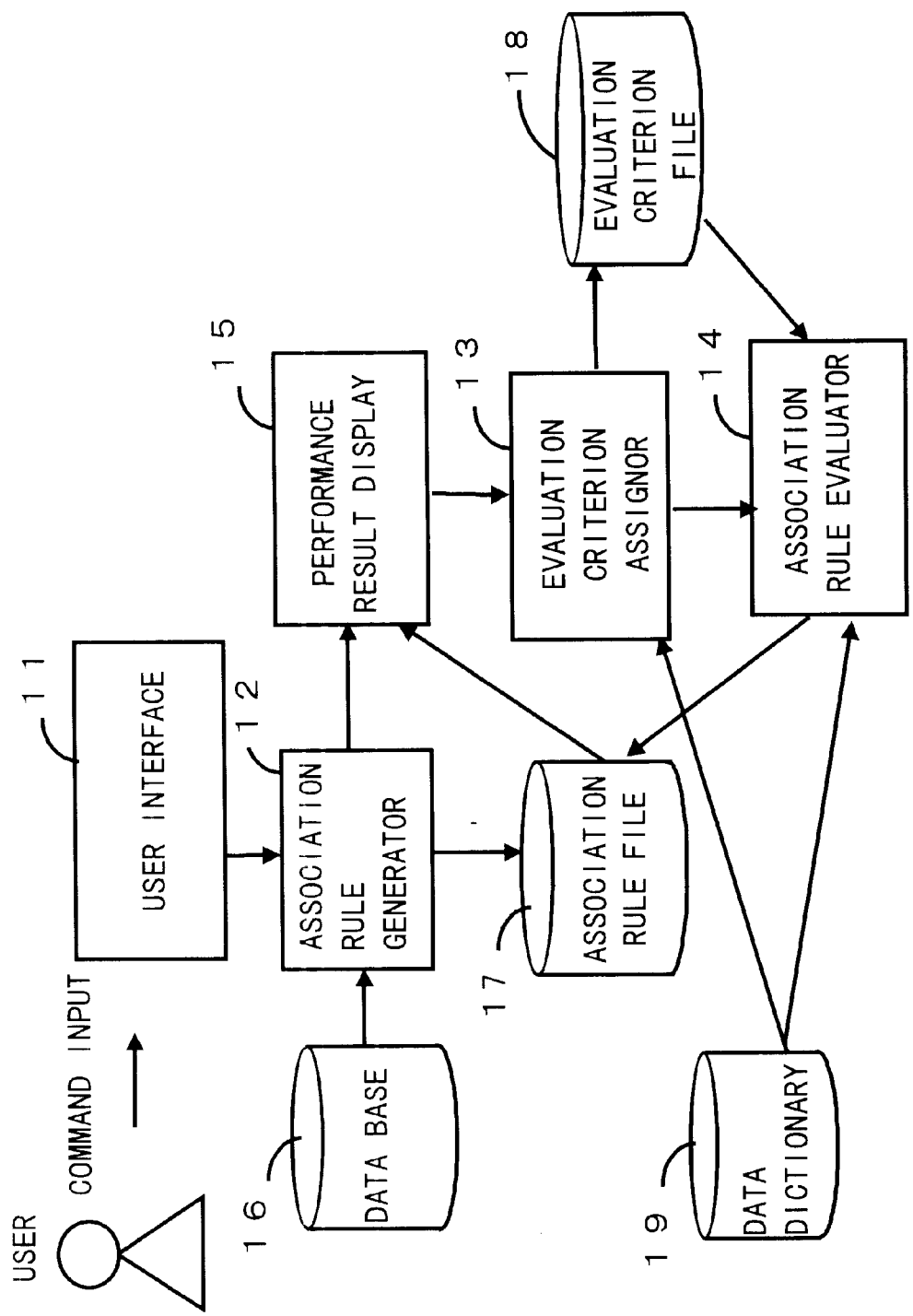
FIG. 1 is a block diagram showing a data mining apparatus of an embodiment of the present invention.

An embodiment of the present invention is explained with reference to FIG. 1. In FIG. 1, a data mining apparatus includes an association rule generator 12 which forms the association rules existing between data items stored in a data base, a performance result display 15 which displays the association rules formed by the association rule generator 12 and carries out the operations such as changing the order of display and limiting (narrowing) the display contents, an evaluation criterion assignor 13 which defines the evaluation criterion of the association rules formed by the association rule generator 12, an association rule evaluator 14 which calculates the value of the association rules formed by the association rule generator 12 based on the evaluation criterion assigned by the evaluation criterion assignor 13. The data mining apparatus further includes a user interface 11 which provides information from the user to the association rule generator 12 to initiate the association rule generator 12, a data base 16 which stores the data to be processed in the data mining apparatus of the present invention, an association rule file 17 for the association rules formed by the association rule generator 12, an evaluation criterion file 18 formed by the evaluation criterion assignor 13, and a data dictionary 19 which is referred to when the evaluation criterion is defined by the evaluation criterion assignor 13.

The operation of the data mining apparatus of the present invention is explained as follows. A user initiates the association rule generator 12 via the user interface 11 and inputs the data stored in the data base 16 into the association rule generator 12. The association rule generator 12 processes the data from the data base 16 and outputs the association rule file 17. According to the above mentioned example, a data item A (bread) and a data item B (milk) are stored in the database 16. By user command, the association rule "bread→milk" (association rule that the customer who buys bread also buys milk at the same time) is output as an association rule file 17 from the association rule generator 12. This association rule file 17 is sent to the performance result display 15. The performance result display 15 displays the association rules from the association rule file 17. The evaluation criterion assignor 13 makes the evaluation criterion file 18. For example, the evaluation criterion assignor 13 allows the user to input an evaluation criterion used to assess the association rules via the display unit shown in FIG. 3 and outputs the evaluation criterion inputted by the user to the evaluation criterion file 18. The performance result display 15 initiates the evaluation criterion assignor 13. The association rule evaluator 14 calculates the value of each association rule stored in the association rule file 17 based on the evaluation criterion defined in the evaluation criterion file 18 and the data dictionary 19 and updates the information relating to the value for each of the association rules. The performance result display 15 displays the association rules stored in this association rule file 17.

Figure 2:
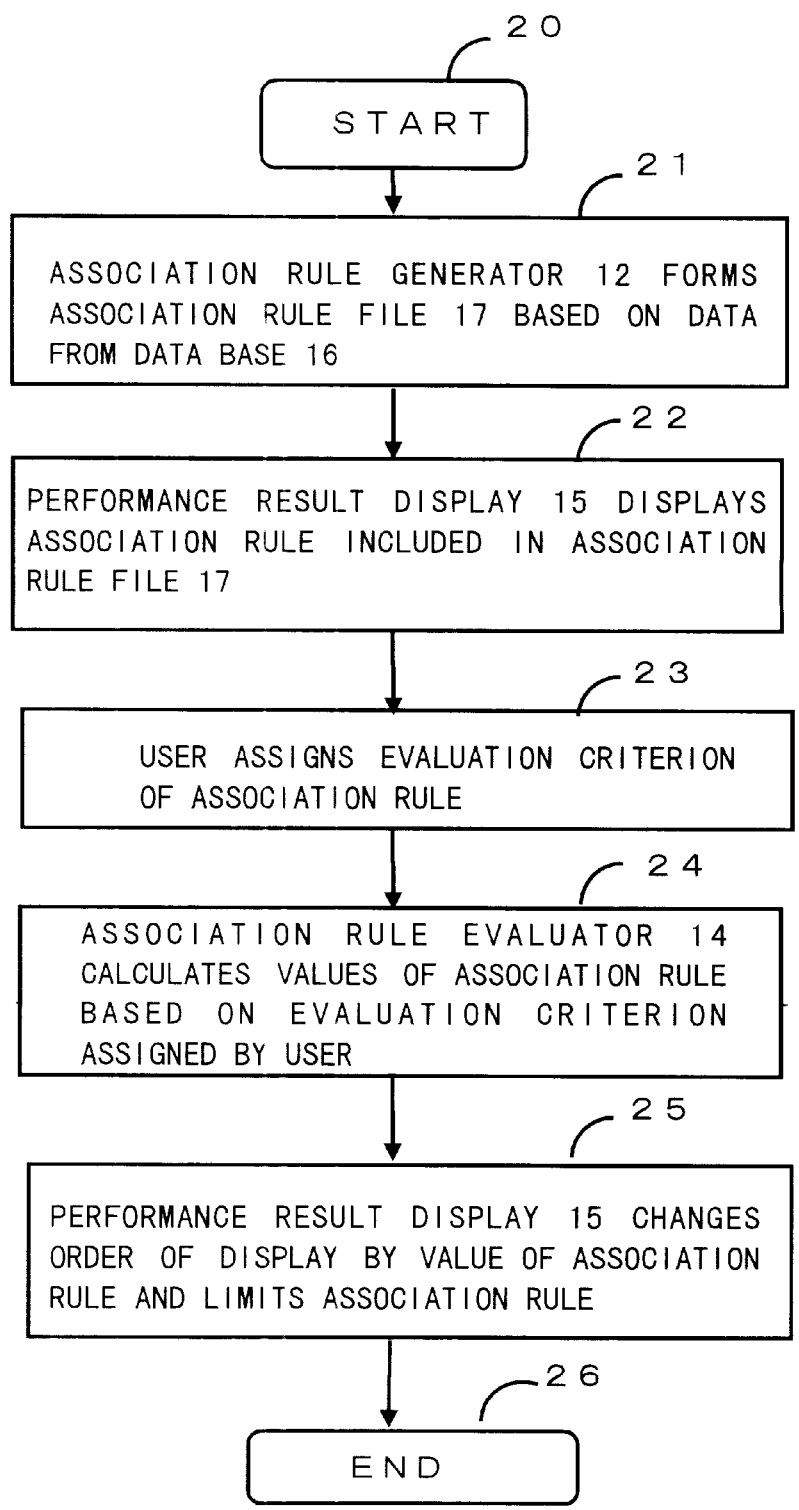
FIG. 2 is a flow chart of the data mining operation of the embodiment of the present invention.

The process performed by the apparatus of FIG. 1 is explained with reference to the flow chart of FIG. 2. Reference numerals 20 and 26 indicate the "START" and "END" of the performed process, respectively. In step 21, the association rule generator 12 forms the association rule file 17 based on the data from the data base 16. The association rule generator 12 uses well-known analysis, for example, that disclosed in the Laid-open Japanese patent publication 8-263346 or Laid-open Japanese patent publication 8-287106. In this case, the minimum support and minimum confidence used in this algorithm are given by the user via the user interface 11.

In step 22, the performance result display 15 receives the association rule file 17 output from the association rule generator 12 and displays the association rules stored in the association rule file 17 as a performance result. The association rule file 17 formed by the association rule generator 12 includes all association rules having values which exceed the assigned minimum support and minimum confidence. At this stage, however, as the evaluation criteria of the association rule, only the support and confidence of the association rules are calculated, but other evaluation criteria such as a profit are not calculated for each association rule. If necessary, the performance result display 15 can change the display order or narrow the association rules to be displayed based on the support and confidence.

In step 23, the user uses the evaluation criterion assignor 13 to define an evaluation criterion. The evaluation criterion is determined by assigning a cost incurred upon applying the association rule and a profit gained when the association rule holds proves true. The cost incurred upon applying the association rule and the profit gained when the association rule holds respectively are defined as mathematical formulas. The mathematical formulas are expressed by fundamental arithmetic formulas including attributes of items, the data dictionary 19 storing various kinds of information about the data items appearing in a left-side of the association rule (antecedent part) and data items appearing in a right-side of the association rule (consequent part), and/or constant term(s).

Figure 3:
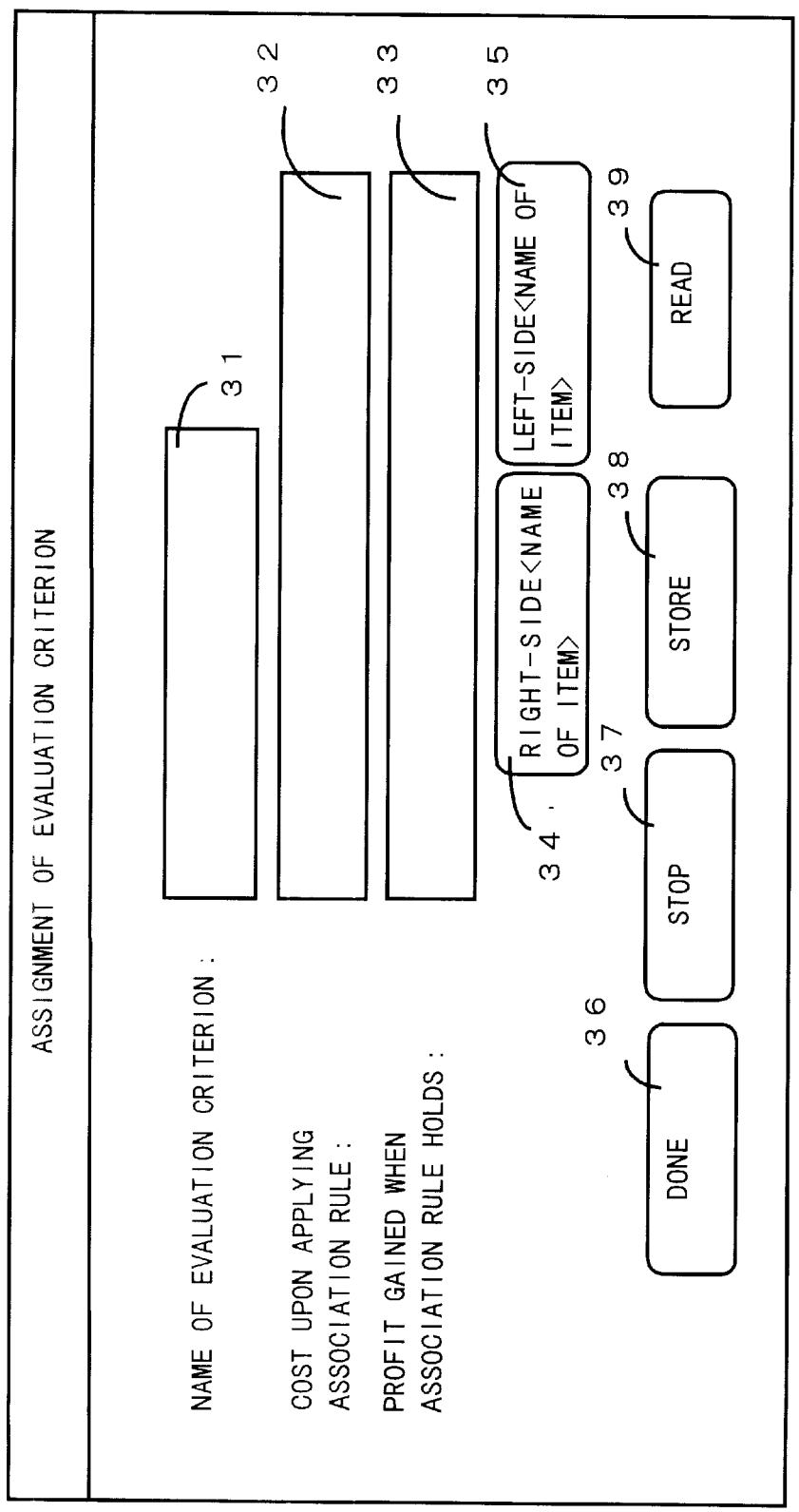
FIG. 3 shows a display for assigning an evaluation criterion of the embodiment of the present invention.

FIG. 3 shows an evaluation criterion display used to assign the evaluation criterion using the mathematical formulas. The cost incurred upon applying the association rule is input into an edit control window 32, and the profit gained when the association rule holds is input into an edit control window 33 in the form of mathematical formulas.

The mathematical formulas are assigned with the edit control window 32 for the cost and with the edit control window 33 for the profit, using the fundamental arithmetic formulas having two variables "right-side <item name>" or "left-side <item name>" and constant terms. The "right-side <item name>" represents a variable for the term assigned in the parenthesis < > of item appeared in the right-side of the association rule (consequent part) which is defined in the data dictionary. The "left-side <item name>" represents a variable for the term assigned in the parenthesis < > of item appeared in the left-side of the association rule (antecedent part) which is defined in the data dictionary.

The display for the evaluation criterion is explained using a simple example. FIG. 4 is an example of the data dictionary 19. In this example, values of some attributes such as "price", "selling price", and "purchasing price" are defined for every data items, such as milk, butter, and bread in the data dictionary.

For example, it is assumed that the association rule is defined as "bread, butter→milk" (meaning that the customer who buys bread and butter also buys milk). In this case, for example, the mathematical formula "right-side <selling price>–a right-side <purchasing price>" is expressed as "milk <selling price>–milk <purchasing price>", since the data item of the right-side of the association rule is "milk". Accordingly, the above mathematic formula signifies that the value of "purchasing price" (here, 80) defined by the data dictionary is subtracted from the value of "selling price" (here, 120) defined by the data dictionary for the data item "milk". More specifically, it signifies that "milk<selling price>–milk <purchasing price>" =120–80=40.

In the same way, the formula "–(left-side <selling price>× 0.2+100)" signifies a negative value of "selling price", which is defined in the data dictionary, multiplied by 0.2 and added to 100. Although the number of the left-side of this association rule is more than one, "left-side <selling price>" can be considered as the sum of the selling prices of each data item in the left-side. In this example, the sum of the "selling price" of data item "bread" and the "selling price" of data item "butter" constitutes the "left-side <selling price>".

It is possible to input the mathematical formulas in the edit control windows 32 and 33 directly from a keyboard. It is also possible, however, to input the formulas by clicking on buttons 34 and 35 and selecting visible terms defined in the data dictionary appearing in a list box 40 as shown in FIG. 5.

Figure 5:
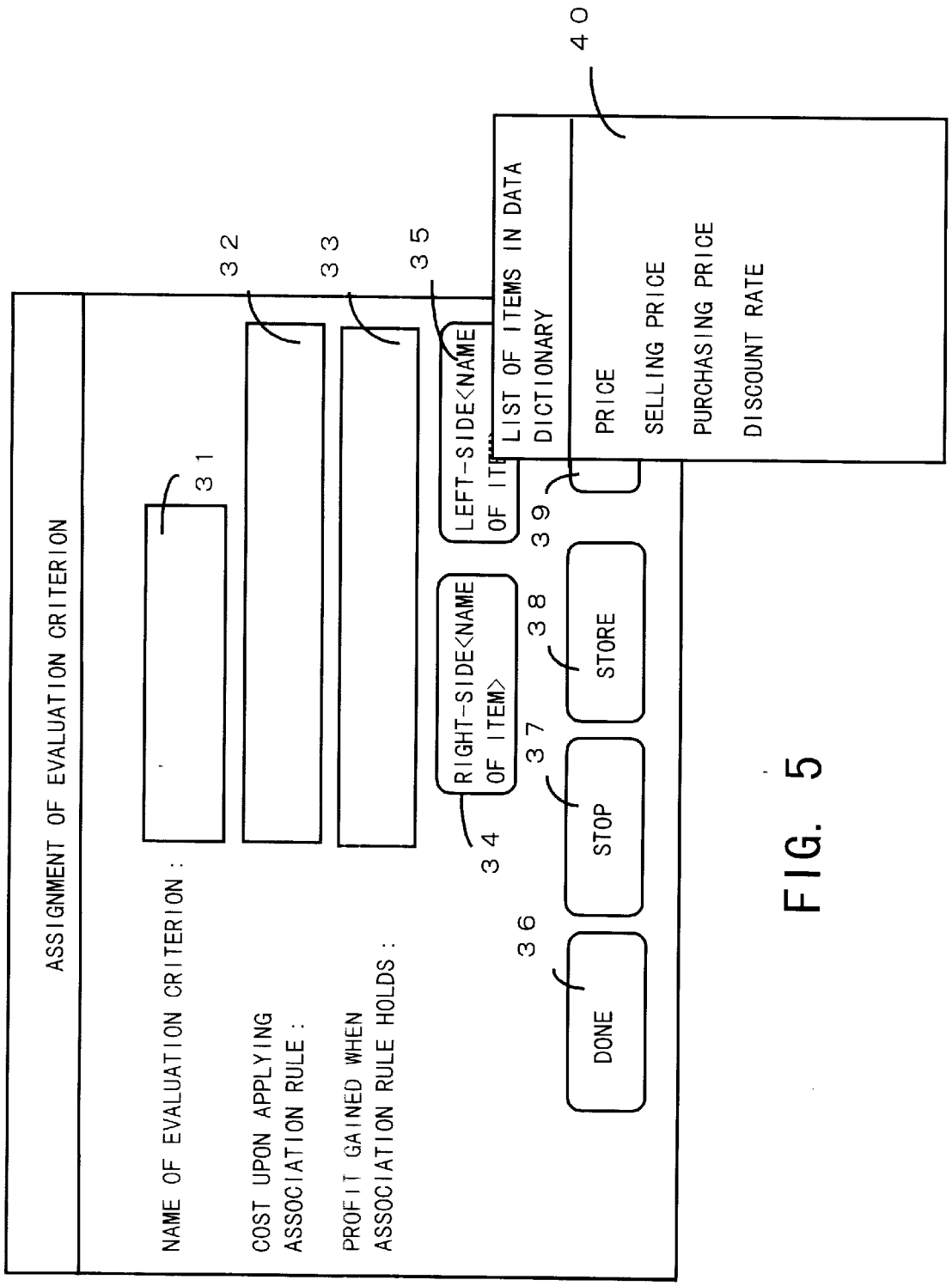
FIG. 5 shows a display for assigning the evaluation criterion of the embodiment of the present invention.

For example, when the control button 35 is clicked on after setting the focus in the edit control window 32 by clicking on the edit control window 32, the list box 40 appears as shown in FIG. 5. If a "selling price" in the list box is clicked on, the characters "left-side <selling price>" are transferred to the edit control window 32. When the control button 34 is clicked on in the same way after setting the focus in the edit control window 32 by clicking on the edit control window 32, the characters "right-side <selling price>" are transferred to the edit control window 32. Although, in the above example, the focus is set in the edit control window 32, the characters are transferred to any one of the edit control windows 32 or 33 having the focus. When the focus is set in the edit control window 33 beforehand, the characters are transferred to the edit control window 33.

A button 38 is used to store the evaluation criterion with the name assigned in the evaluation criterion assigning display. If the name of the evaluation criterion is input in the edit control window 31 and the button 38 is clicked on, the assigned evaluation criterion can be stored. The evaluation criterion stored in this way can be read later and can be reused. By clicking on button 39, a list of the names of the evaluation criteria currently stored is indicated and the user can choose among them. Assignment of the evaluation criterion can be stopped by clicking on button 37. When a button 36 is clicked on, the evaluation criterion is decided by the mathematical formula assigned through the edit control windows 32 and 33 and the evaluation criterion assigning step is finished.

Step 24 is explained with reference to FIG. 2. The association rule evaluator 14 in step 24 calculates the value of the association rule using the evaluation criterion assigned by the user in step 23, and updates the value for the association rule in the association rule file 17. The calculation of the value of the association rule in this step 24 is given below;

association rule value =profit gained when the association rule
holds×(support of association rule x confidence of association
rule)+(cost upon applying the association rule × support of
association rule)  (1)

In the above mathematical formula (1), the profit gained when the association rule holds is a value obtained by calculating the mathematical formula assigned in the edit control window 33 of FIG. 3 for each association rule, and cost incurred upon applying the association rule is a value obtained by the mathematical formula assigned in the edit control window 32 of FIG. 3 for each association rule. For example, it is assumed that the mathematical formula "right-side <selling price>−right-side<purchasing price>" is assigned via the edit control window 32. In the association rule "bread, butter→milk", "selling price of milk−purchasing price of milk" is calculated for each association rule, and in the association rule "ice cream→juice", "selling price of juice−purchasing price of juice" is calculated for each association rule. Upon evaluating (calculating) this mathematical formula, the variables used in the formula, for example, "selling price and purchasing price of milk" and "selling price and purchasing price of juice" are obtained from the values defined in the data dictionary 19.

As described above, since the support of the association rule represents the generality of the rule, upon using the association rule, it is considered that the association rule can be greatly applied when the support of the association rule is large. The confidence is the probability that the association rule holds, and it is considered the degree of expectation for the result or profit that the user expects to obtain when the user uses the association rule. The above mathematical formula (1) is defined based on such a premise.

In step 25, the performance result display 15 receives the association rule file 17 storing evaluation values which have been updated in step 24, changes the order of the association rules based on the evaluation values calculated in step 24, displays the corresponding association rules in ascending or descending order according to the user's request, and narrows the display contents by displaying only the association rules having an evaluation value which is more (or less) than a threshold. For example, when the user's object is "to discover an association rule for estimating large profit", the expected value of profit is calculated as the evaluation criterion for each association rule. As a result, only the association rules having a value exceeding a certain threshold can be displayed, and the association rules can be displayed in descending order. As described above, it is possible for the data mining apparatus to easily support examining operations for the valid association rules based on the user's request, for example, by highlighting the display of association rules having large profit criterion values.

The above description is illustrates using a simple example. In the example, a shopkeeper wants to improve profits by direct-mail-marketing using an association rule obtained through basket analysis. The shopkeeper first obtains data used for the data mining. As a result of the basket analysis performed on the obtained data, he discovers a large number of association rules. An example for finding an association rule which is useful for the direct-mail-marketing from among a large number of association rules is described below.

The direct-mail-marketing aims to promote sales by sending direct mailings to consumers who may be persuaded to buy the advertised goods after seeing the mailing. Naturally, some of those who see the direct mailings will buy goods, and others will not. Since it is expensive to send direct mailings, if a group of consumers who may buy the goods with high probability is recognized, it is possible to make efficient use of direct-mail-marketing. For example, if there is a tendency that "the customer who buys good A also buys good B at the same time", expressed by the association rule "good A→good B", the shopkeeper can make a sales-promoting-strategy, in which a potential customer group would buy the good B by sending advertisements about the good B to the customers who bought the good A.

In the above example, assuming it costs 100 units to send a direct mailing, actual profit gained when customers buy goods in response to the direct mailings only happen when the goods in the right-side of the association rule are sold. In the same way as the example of FIG. 4, it is assumed that the items such as "price", "selling price", and "purchasing price" are defined in the data dictionary 19. In step 23 in FIG. 2, the evaluation criteria that the user has to assign by an evaluation criterion assignment display 3 are as follows;

cost incurred upon applying the association rule:−100 <profit gained when the association rule holds: right-side <selling price>−right-side<purchasing price>

If the evaluation values for the association rules are calculated with the above evaluation criterion, and if the direct mailings are sent according to the contents of the association rules (for example, the advertisement for the good B has been sent to the customers who bought the good A when the association rule is "good A→good B"), the expected actual profit is equal to an evaluation value of the association rule. For example, for the association rule "good A→good B", (profit−cost) becomes an evaluation value. Since it is assumed that the profit is (selling price of good B−purchasing price of good B) and the cost is 100 units, the following relation is obtained;

evaluation value=(selling price of good B−purchasing price of good B) × support × confidence−100 × support.

As another example, let's assume that good D for a large sales volume cannot be expected but a large profit can be obtained even if one is sold. As a result of data mining, the association rule "good C→good D" (a customer who buys good C also buys good D) is discovered as an association rule which includes good D on the right-side. As stated above, since a large sales volume cannot be expected for good D, the support for this association rule is low. Furthermore, if the confidence of this association rule is also low, the overall evaluation of this association rule is low in view of the low confidence and the low support. If the evaluation criterion of this example is used, however, there is a possibility that a high value is obtained due to the large profit gained upon selling one good, even if both of the support and confidence are low. In this way, valuable association rule, which may be buried among a large number of association rules if the association rule is assessed solely based on the confidence and the support, can be discovered.

For example, we assume that a new evaluation criterion "prospect of profit" that is the expected profit of each rule, is defined and there is a valuable association rule whose value of the evaluation criterion is large but whose support and confidence are small. The smaller the minimum support and minimum confidence are, the more association rules are discovered by the association rule generator 12. So without the evaluation criterion "prospect of profit", it is difficult for user to find such a valuable rule from a large number of association rules discovered by the association rule generator 12. But if the values of "prospect of profit" of all association rules are calculated, user can distinguish valuable association rules (when the association rules are applied, a large profit is expected) from trivial rules by displaying only the association rules whose values of "prospect of profit" are above a threshold or displaying association rules in the order of the value of "prospect of profit".

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data mining apparatus for discovering and evaluating association rules existing between data items of a data base comprising:

an association rule generator for receiving data items from a data base and forming association rules between the data items;

an evaluation criterion assignor with which a user assigns an evaluation criterion for assessing the association rules, the assigned evaluation criterion being related to the user's purpose;

an association rule evaluator for calculating a value for each association rule generated by said association rule generator as a function of the evaluation criterion assigned by the user with said evaluation criterion assignor and at least one of support for the association rule and confidence for the association rule; and a performance result display for displaying the association rules generated by said association rule generator based on the value of each association rule calculated by said association rule evaluator.

2. The data mining apparatus according to claim 1, wherein said evaluation criterion assignor assigns an evaluation criterion based on a cost incurred upon applying the association rule and a profit gained when the association rule holds.

3. The data mining apparatus according to claim 2, wherein the cost incurred upon applying the association rule and the profit gained when the association rule holds are described using a fundamental arithmetic formula which includes variables defined for each data item in a data dictionary and/or a constant value.

4. The data mining apparatus according to claim 3, wherein said association rule evaluator refers to data item values defined in the data dictionary upon calculating the arithmetic formula in which the cost incurred upon applying the association rule and the profit gained when the association rule holds are described.

5. The data mining apparatus according to claim 2, wherein said evaluation criterion assignor stores information regarding the cost incurred upon applying the association rule and the profit gained when the association rule holds in a storage apparatus and subsequently reads the stored information for reuse.

6. The data mining apparatus according to claim 1, wherein the association rule evaluator calculates an evaluation value for an association rule based on the cost incurred upon applying the association rule and the profit gained when the association rule holds which are assigned by the evaluation criterion assignor, a confidence showing accuracy of the association rule in the data base, and the support showing a ratio of the number of records in which the association rule holds in the data base to the total number of records.

7. The data mining apparatus according to claim 1, wherein said performance result display displays only the association rules having an evaluation value calculated by the association rule evaluator which is larger than a reference value assigned by the user.

8. The data mining apparatus according to claim 1, wherein said performance result display displays the association rules obtained by the association rule generator after arranging them in ascending or descending order based on the evaluation value calculated by said association rule evaluator.

9. The data mining apparatus according to claim 1, wherein said association rule evaluator calculates a value for each association rule generated by said association rule generator as a function of the evaluation criterion assigned by the user with said evaluation criterion assignor, support for the association rule, and confidence for the association rule.

10. A data mining method for discovering and evaluating association rules existing between data items of a data base, said method comprising:

receiving data items from a data base and generating association rules between the data items;

assigning an evaluation criterion to be used for assessing the generated association rules, the assigned evaluation criterion being related to a user's purpose;

calculating a value for each generated association rule as a function of the assigned evaluation criterion and at least one of support for the association rule and confidence for the association rule; and displaying generated association rules based on their respective calculated values.

11. The data mining method according to claim 10, wherein said step of assigning an evaluation criterion assigns an evaluation criterion based on a cost incurred upon applying the association rule and a profit gained when the association rule holds.

12. The data mining method according to claim 11, wherein the cost incurred upon applying the association rule and the profit gained when the association rule holds are described using a fundamental arithmetic formula that includes variables defined for each data item in a data dictionary and/or a constant value.

13. The data mining method according to claim 12, wherein said step of calculating refers to data item values in the data dictionary when calculating the arithmetic formula in which the cost incurred upon applying the association rule and the profit gained when the association rule holds are described.

14. The data mining method according to claim 11, further comprising:

storing information regarding the cost incurred upon applying the association rule and the profit gained when the association rule holds in a storage apparatus and subsequently reading the stored information for reuse.

15. The data mining method according to claim 10, wherein said step of calculating calculates an evaluation value for a generated association rule based on the cost incurred upon applying the association rule and the profit gained when the association rule holds, a confidence showing accuracy of the association rule in the data base, and a support showing a ratio of the number of records in which the association rule holds in the data base to the total number of records.

16. The data mining method according to claim 10, wherein said step of displaying displays only the association rules having a calculated value that is larger than a reference value assigned by the user.

17. The data mining method according to claim 10, wherein said step of displaying displays generated association rules after generated association rules are arranged in ascending or descending order based on their respective calculated values.

18. The data mining method according to claim 10, wherein said step of calculating calculates a value for each generated association rule as a function of the assigned evaluation criterion, support for the generated association rule, and confidence for the generated association rule.

* * * * *